Figure 1:
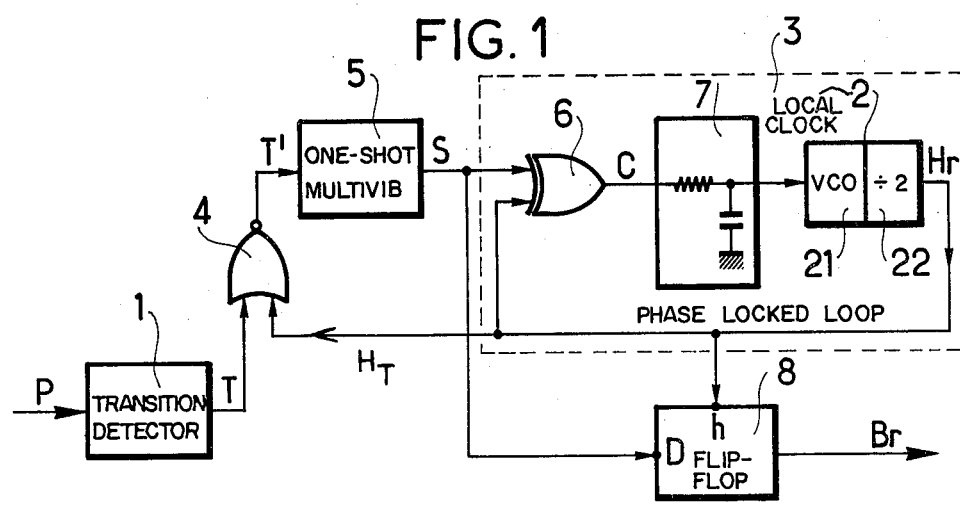

United States Patent [19]
Burgert

[11] 4,112,383
[45] Sep. 5, 1978

[54] MILLER-ENCODED MESSAGE DECODER
[75] Inventor: Albert Burgert, Arcueil, France
[73] Assignee: Societe Anonyme dite: Compagnie Industrielle des Telecommunications Cit-Alcatel, Paris, France
[21] Appl. No.: 819,383
[22] Filed: Jul. 27, 1977
[30] Foreign Application Priority Data
Aug. 4, 1976 [FR] France ................. 76 23808
[51] Int. Cl.² ...................... H03K 9/10; H03K 13/24
[52] U.S. Cl. .................................. 329/50; 325/321; 329/106; 329/107; 329/122; 331/1 A; 331/23; 331/25
[58] Field of Search ................. 329/50, 104, 106, 122, 329/124, 107; 340/347 R, 347 DD; 331/1 A, 23, 25; 360/44, 51; 325/321

[56] References Cited
U.S. PATENT DOCUMENTS
3,537,082 10/1970 Vallee ........................... 360/51 X
3,982,195 9/1976 Turner ............................ 329/50

OTHER PUBLICATIONS
Calfee et al., "Bandwidth Compression Method", IBM Technical Disclosure Bulletin, vol. 10, No. 7, Dec. 1967, pp. 909-910.

Primary Examiner—Siegfried H. Grimm
Attorney, Agent, or Firm—Roland Plottel

[57] ABSTRACT

A device for decoding a Miller-encoded message in the form of binary data at a clock frequency F. The decoder comprises: a transition detector which provides a very short pulse at each transition in the encoded message; first means controlled by a local clock at frequency F to pass only those short pulses which have the same phase; second means for stretching the short pulses passed by the first means to a duration of (1/2F); a local clock phase lock loop acting on a voltage-controlled oscillator of the local clock and responsive to the output signal of the second means; and a flip-flop to sample the output of the second means under the control of the local clock.

4 Claims, 3 Drawing Figures

MILLER-ENCODED MESSAGE DECODER

The invention relates to the field of pulse code (digital) transmission, and takes the form of a device for the decoding of messages resulting from the Miller (or delay modulation) encoding of synchronous binary information clocked by a time-base of frequency F, referred to in the following as the "source-clock", and which for each binary digit defines a bit-time of duration 1/F.

As it is known, the Miller or delay modulation code is a binary (and consequently two-level) code, in which the "positions" in time of transitions between levels are significant in conveying the intelligence. More precisely, the Miller code may be described as follows:

each bit of a first value, 1 (or 0), is represented by a transition in the center (or respectively at the end) of its bit-time.

each bit of a second value, 0 (or 1), is represented by a transition at the start (or respectively in the center) of its bit-time, subject to said second-value bit not being preceeded by a first-value bit, in which case there is no transition in its bit-time.

In other words:

Bits 1 and 0 are arbitrarily assigned "ranks", of which one is called "first" and the other "second". Assuming 1 to be of the first rank, and 0 to be of the second rank, the transitions signifying "1" will occur at the centers of corresponding bit-times, and those signifying "0" will occur at the starts of corresponding bit-times, except when a "0" immediately follows a "1", in which case there will not be any transition in the bit-time for that 0.

In the reverse case, namely 0 = "first" and 1 = "second", the transitions signifying 0 occur at the ends of their bit-times, and 1's will be marked by central transitions, unless a 1 immediately follows a 0, when its bit-time will be transitionless.

For decoding of a message so encoded, the frequency and phase of the source clock must be known. It is common knowledge, that this information can be derived from the transitions in the message itself: in the U.S. Pat. No. 3,108,261, a description is given of a Miller-encoded message decoder, in which a local clock of the same nominal frequency as the source clock and phase-controlled by the transmitted transitions, is used to reconstitute the source clock. In said patent the local clock is a multivibrator delivering a first and a second clock signal in phase opposition, and provided with a first and a second sync. input for respectively the one and the other clock signal.

A sync. pulse is applied to the first clock's input on appearance of message transitions situated in time near the end of a first and beginning of a second period in that clock signal, thereby synchronising the rising pulse edges of the first clock with message transitions of this first type, and a sync. pulse is applied to the second clock's input at each message transition approximately coinciding with the center of a period of the first clock, thereby synchronising the rising edges of the second clock, and consequently the falling edges of the first, with message transitions of this second type.

The transmission of message preambles composed of strings of identical bits provides the necessary information for phase-locking of the local clock onto the source clock.

Such an assembly, in which the local clock receives a sync. pulse at each detected message transition carries the disadvantage of being very sensitive to fading, and to noise and jitter affecting the transmitted message, disturbances frequently encountered in practice, particularly in radio transmission.

The present invention reduces this disadvantage, while offering the possibility of producing a particularly simple decoding device.

The present invention provides a device for the decoding of messages resulting from encoding according to the Miller code of binary data clocked at frequency F, and comprising a transition detector for the detection of message transitions, and a local clock including a voltage controlled oscillator phase-controlled by a control signal which is a function of the detected transitions, said local clock delivering a signal Hr at the rate F and consisting of bidirectional pulses providing 1st and 2nd levels each of a duration = 1/2F the device comprising a first unit connected to said detector and receiving said clock signal Hr, delivering a pulse I of duration = 1/2F subsequent to each transition appearing in the message when signal Hr is at a determined level of the two possible, and a second unit for the modulation of said signal Hr by signal S consisting of the string of pulses I, said voltage-controlled oscillator of the local clock being controlled by the modulated signal delivered by said second unit through a low-pass filter, so that the the determined levels of signal Hr are centered on the message transitions having produced pulses I, the original binary data being restored by sampling signal S with the edges of signal Hr going from the determined level to the other.

In a particular embodiment of the invention, said message transition detector delivers a short pulse, called a "transition" pulse; in response to detection of each message transition, and said first unit has a gate for selection amongst the transition pulses of those which appear when signal Hr is at the stated level, plus a single-shot multivibrator to expand the transition pulses so selected to 1/2F duration.

An embodiment of the invention is described by way of example, with reference to the accompanying drawing in which:

FIG. 1: is a block diagram of a device embodying the invention; and

Figure 2:
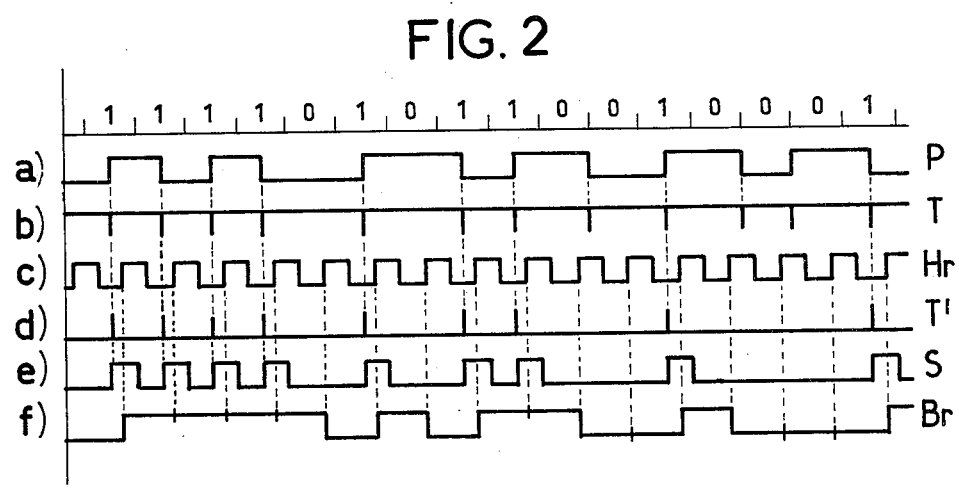
Figure 3:
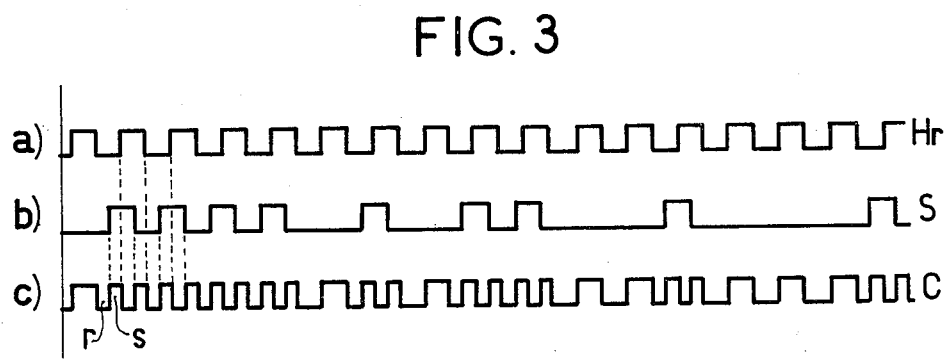

FIGS. 2 and 3: are wave-form diagrams illustrating the operation of the device represented in FIG. 1.

The example represented by the figures is that of a Miller-encoded message decoder in which:

transition at the center of a bit-time represents a binary 1 transition at the start of a bit-time represents a binary 0 not following a binary 1.

In FIG. 1, a message P in Miller code of binary data B clocked by signal H at frequency F is applied to transition detector 1. Detector 1, of known type, responds to each transition in message P by delivering a very short pulse T, referred to as a "transition" pulse. Pulses T are, for example, negative.

Local clock 2, comprising a voltage-driven oscillator 21 followed by a scale-of-two frequency divider 22 is comprised within a phase-locking loop 3, driven by signal S developed from transition pulses T, and to which we shall refer later.

Local clock 2 delivers signal Hr of form factor $\frac{1}{2}$, hence at frequency F of clock signal H when the phase locking circuit is closed, but which leads signal H by a quarter of a period.

For the generation of signal S, clock signal Hr composed of alternating bidirectional pulses, each lasting 1/2F, is connected to a first input of NOR gate 4, of which the second input receives the transition pulses T. Gate 4 inverts and passes the transiton pulses T which appear at its input simultaneously with the low levels of signal Hr, but blocks those appearing during the high levels of Hr.

As Hr leads H by a quarter of a period, gate 4 therefore inverts the T pulses which represent the transitions appearing at the centers of bit-times, and rejects those representing transitions appearing at the starts of bit-times. The very short output pulses T' of gate 4 drive a single-shot multi-vibrator 5, which extends the duration of said pulses T' to 1/2F. Consequently, multi-vibrator 5 delivers a string of positive pulses I of duration = 1/2F, which appear in step with the message transitions in signal P occuring during the low levels of signal Hr, that is to say, in step with transitions situated at the centers of the bit-times of message P. The string of pulses I constitutes signal S driving phase-locking loop 3.

Said phase-locking loop 3 comprises, in addition to local clock 2, an exclusive OR gate 6, of which a first input receives signal S and a second signal Hr, for the purpose of modulating the phase of signal Hr with signal S. The modulated signal delivered by gate 6, namely signal C, is fed through a low-pass filter 7 to drive oscillator 21. The latter responds by delivering a signal at frequency 2F, which, after division by 2 of its frequency and shaping in divider 22, becomes signal Hr. With reference to FIG. 3, we shall return to operation of this loop subsequently.

The decoding device represented also comprises a flip-flop 8 of type D with its D input receiving signal S and its clock-input $h$ receiving signal Hr. Flip-flop 8 delivers a signal Br which, as we shall see, restores the binary data B.

If we refer to the description of the Miller code, we see that message P contains binary digits 1 represented by transitions in the center of bit-times, whereas binary digits 0 are represented either by the absence of transitions, or transition at the starts of their bit-times. To decode message P, it is therefore sufficient to detect the presence or absence of transitions near the centers of the bit-times. According to the foregoing description, this detection is performed by gate 4, and the presence of such a transition in a bit-time causes the appearance in signal S of a pulse I coinciding with the entire second half of the bit-time. As clock signal Hr leads clock signal H by a quarter of a period (H defining the bit-times), each pulse I therefore extends from the last quarter of a period of signal Hr, to the first quarter of the next period. Consequently, sampling signal S at the start of each period of signal Hr restores the binary data B. As the sampling is performed by a flip-flop, the data is restored in NRZ form, and further, because of the quarter period lead of Hr over H, they are restored with a delay of three-quarters of a period.

FIG. 2 illustrates operation of the device represented in FIG. 1. Line ($a$) represents a particular example of message P for decoding, the various bit-times and binary digit values B being shown directly above. Line ($b$) represents the transition pulses T delivered by response of detector 1, and line ($c$) the clock signal Hr. Lines ($d$) and ($e$) respectively represent pulses T' and signal S. The decoded message Br is represented by line ($f$).

It is of course assumed that a message preamble has been transmitted to permit phase-locking by loop 3.

A string of 16 bits of message P is represented: there is a transition at the center of the bit-time in the first four such times represented, and in the 6th, 8th, 9th, 12th, and 16th, the corresponding digits being 1's. Each of these 9 central transitions results in delivery of a transition pulse T coinciding with the center of a signal Hr low level. Gate 4 therefore passes and inverts each of these 9 pulses, so that signal S has a pulse I during the second half of each of these 9 bit-times. Sampling of signal S by the 9 rising edges of signal Hr situated at three quarters of these 9 bit-times, therefore delivers level 1 in signal Br each time.

Message P has no transition during the 5th, 7th, 10th and 13th bit-times represented (bits 0 following a bit 1). There is therefore no pulse T, and consequently no pulse I, during each of these 4 bit-times: sampling of signal S at three quarters of each bit-time therefore delivers a 0 level in signal Br each time.

A transition at the start of a bit-time appears in the 11th, 14th and 16th bit-times of the message represented (bits 0 not following a bit 1). Three pulses T delivered by detector 1 in response to these 3 transitions at the start of bit-times each appear during a high level of signal Hr, and are consequently rejected by gate 4. Therefore, signal S has no pulse I during each of these 3 bit-times, and flip-flop 8 therefore delivers a binary 0 for each of these bits, with a lag of three quarters of a period.

Lines ($a$) and ($b$) in FIG. 3 are ($c$) and ($e$) respectively of FIG. 2, line ($c$) of FIG. 3 representing the signal C fed through low-pass filter 7 to drive oscillator 21.

It can be easily seen that according to FIG. 3, when the operative levels of signal Hr (which in the form of the invention described, are the low levels) are centered on the start of pulses I of signal S, the bidirectional pulses such as $r$ and $s$ of signal C are of identical width, and signal C has a d.c. component which is constant, whatever the message content. This constant d.c. component applied in driving oscillator 21 maintains balance.

If, on the contrary, the frequency of signal Hr is a little too high, the starts of pulses I occur a little later. Thus, the low levels of signal C such as $r$ become wider, to the detriment of the high levels such as $s$, which become narrower: the voltage applied in driving oscillator 21 diminishes, thereby re-establishing balance.

Similarly, it can be seen that if frequency Hr is a little too low, the effect is to increase the voltage applied to oscillator 21, again re-establishing balance.

It will be noted, at this point, that there are in theory two positions of balance for loop 3, the one corresponding with locking on the centrally-located transitions of message P, and the other with phase-locking on the transitions situated at the starts of the time-units: in the first case, signal Br effectively reproduces the binary data B, and in the second, signal Br does not reproduce the data correctly.

In practice, however, erroneous phase-locking is rare, because of the fact that in binary data B of the random type, which is the more general case, message P has twice as many centrally-located transitions as transitions located at the beginning of bit-times. If, however, it is desired to exclude any risk of error in phase-locking, it is sufficient to transmit a message preamble composed (for example) of a string of 1's, or a string of alternating 1's and 0's, and therefore exclusively comprising centrally-located transitions (in all bit-times in the first case, and in every other bit-time in the second): this forces loop 3 to lock onto these transitions.

What has been described is a particular form of the device according to the invention. It is however evident that changes may be made and/or certain items replaced by others which are technically equivalent. In particular, the purposes of the high and low levels of signal Hr may be reversed, to select transition pulses occuring on the high levels of this signal, and sampling signal H with the falling edges of signal Hr. Further, the invention is not restricted to the particular Miller code taken as an example for the description and reference to the figures, but may be applied to any code of this type, as defined in the preamble hereto.

What we claim is:

1. Apparatus for decoding a Miller-encoded signal in the form of binary data at a clock frequency F, which comprises:

a transition detector, receiving said Miller-encoded signal, for detecting the transitions in said signal;

a phase controllable local clock, having a control signal input, for generating a clock signal Hr at the rate F, said clock signal comprising a train of bidirectional pulses providing first and second levels each of duration 1/2F;

means, connected to the output of said transition detector and to the output of said clock circuit, for generating a pulse I of duration 1/2F subsequent to each transition in the signal to be decoded when clock signal Hr is at a predetermined one of said first and second levels, said pulses I constituting an output signal S, means for generating a control signal for said local clock from said clock signal Hr and said signal S, said local clock control signal generating means comprising means, connected to the output of said pulse-generating means and to the output of said clock circuit, for phase modulating said signal Hr by said signal S, and a low-pass filter connected to the output of said phase modulating means, the output signal of said low-pass filter being applied to the control signal input of said local clock so that the pulses of signal Hr providing said predetermined level are centered on the Miller-encoded signal transitions which produced pulses I, the original binary data being restored by sampling signal S with edges of signal Hr which go from said predetermined level to the other.

2. The apparatus according to claim 1 wherein said transition detector generates a brief transition pulse in response to each transition in the signal to be decoded, said pulse generating means comprising:

a gate circuit having a first input connected to the output of said transition detector and a second input connected to the output of said clock circuit, said gate circuit passing those of said brief transition pulses which appear while clock signal Hr is at said predetermined level; and a one-shot multivibrator, connected to the output of said gate circuit for expanding the duration of any pulses passing therethrough to 1/2F.

3. The apparatus according to claim 1 wherein said modulating means comprises an exclusive OR-gate having a first input receiving the signal S, a second input receiving the clock signal Hr and an output connected to said low pass filter.

4. The apparatus according to claim 2 wherein said modulating means comprises an exclusive OR-gate having a first input receiving the signal S, a second input receiving the clock signal Hr and an output connected to said low pass filter.

* * * * *